(12) United States Patent
Wang et al.

(10) Patent No.: US 8,128,235 B2
(45) Date of Patent: Mar. 6, 2012

(54) ILLUMINATING DEVICE AND PROJECTING APPARATUS USING THE SAME

(75) Inventors: Shen-Huei Wang, Hsin-Chu (TW); Wei-Cheng Lo, Hsin-Chu (TW); Shang-Hsuang Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 355 days.

(21) Appl. No.: 12/457,266

(22) Filed: Jun. 5, 2009

(65) Prior Publication Data

US 2010/0007857 A1    Jan. 14, 2010

(30) Foreign Application Priority Data

Jul. 9, 2008   (TW) .............................. 97125846 A

(51) Int. Cl.
   *G03B 21/16*   (2006.01)

(52) U.S. Cl. ................ 353/52; 353/56; 353/57; 353/60; 353/61; 353/119; 353/122; 362/294; 362/373; 362/218; 362/96; 362/547

(58) Field of Classification Search .............. 353/52, 353/56, 57, 60, 61, 119, 122; 313/25, 113, 313/111, 114, 112, 146, 151; 362/293, 294, 362/296, 345, 347, 348, 507, 510, 263, 264, 362/297, 310, 346, 257, 373, 362, 546, 547, 362/218; 315/312, 291
See application file for complete search history.

(56) References Cited

U.S. PATENT DOCUMENTS

| | | | | |
|---|---|---|---|---|
| 5,842,761 | A  * | 12/1998 | Futakami et al. | 353/119 |
| 6,559,600 | B1 * | 5/2003 | Wada et al. | 313/634 |
| 6,561,675 | B1 * | 5/2003 | Kavanagh | 362/263 |
| 6,979,086 | B2 | 12/2005 | Hu | |
| 6,991,335 | B2 * | 1/2006 | Kondo et al. | 353/54 |
| 7,008,070 | B2 * | 3/2006 | Nishida et al. | 362/19 |
| 7,288,899 | B2 * | 10/2007 | Akiyama | 315/291 |
| 7,367,694 | B2 * | 5/2008 | Chen et al. | 362/373 |
| 2003/0146718 | A1* | 8/2003 | Horiuchi et al. | 315/291 |
| 2005/0001989 | A1* | 1/2005 | Fujimori et al. | 353/57 |

(Continued)

FOREIGN PATENT DOCUMENTS

JP   2002-357867   12/2002

(Continued)

OTHER PUBLICATIONS

Office action of CN200810215369.9, dated Jul. 9, 2010, 5 pages.

*Primary Examiner* — Georgia Y Epps
*Assistant Examiner* — Sultan Chowdhury
(74) *Attorney, Agent, or Firm* — Bacon & Thomas, PLLC

(57) ABSTRACT

An illuminating device adapted to a projecting apparatus including a lamp module, a power module, and a fan is provided. The lamp module is separately disposed in the projecting apparatus. The lamp module has a lamp, an igniting module and a plate. The igniting module is capable of generating a high voltage signal to drive the lamp. The plate is disposed between the lamp and the igniting module for shielding radiating heat generated by the lamp. The power module is capable of generating a low voltage signal transmitted to the igniting module through a low voltage power line. The igniting module transforms the low voltage signal into the high voltage signal to drive the lamp. The fan is disposed at a first side of the lamp for cooling the lamp.

16 Claims, 3 Drawing Sheets

U.S. PATENT DOCUMENTS

| | | | |
|---|---|---|---|
| 2005/0073658 A1* | 4/2005 | Chang et al. | 353/52 |
| 2007/0030454 A1* | 2/2007 | Richards | 352/242 |
| 2007/0285623 A1* | 12/2007 | Kuraie | 353/58 |
| 2008/0024853 A1* | 1/2008 | Tanaka et al. | 359/238 |
| 2009/0001904 A1* | 1/2009 | Okawa | 315/291 |

FOREIGN PATENT DOCUMENTS

| | | |
|---|---|---|
| TW | 200411319 | 7/2004 |
| TW | I277820 | 10/2005 |
| TW | M297485 | 9/2006 |

* cited by examiner

ILLUMINATING DEVICE AND PROJECTING APPARATUS USING THE SAME

BACKGROUND OF THE INVENTION (1) Field of the Invention

This invention relates to an illumination device, and more particularly relates to an illumination device adapted to a projecting apparatus.

(2) Description of the Related Art

FIG. 1 is a block diagram of a typical projecting apparatus 10. As it shows, the projecting apparatus 10 has an illuminating device 12, an image module 14 and a projection module 16. The illuminating device 12 is utilized for providing high brightness light beams for the projecting apparatus 10. The image module 14 converts the light beams from the illuminating device 12 into image beams corresponding to the image signals from outward. The projection module 16 projects the image beams to a screen.

FIG. 2 is a schematic view of the typical illuminating device 12 of the projecting apparatus 10. As it shows, the illuminating device 12 includes a lamp 122, a power drive module 124, and a fan 126. The lamp 122 is utilized to provide high brightness illumination for the projecting apparatus 10. The power drive module 124 has an igniting module 124a and a power module 124b. The power module 124b transforms the inputted voltage signal Vin into a low voltage signal V1 (about 380V) for the igniting module 124a. During ignition, the igniting module 124a transforms the low voltage signal V1 into a high voltage signal V2 to drive the lamp 122. The fan 126 is disposed at a side of the lamp 122 to generate airflow (shown by the arrows) for cooling the lamp 122.

The power drive module 124 outputs the high voltage signal V2 to drive the lamp 122. The high voltage signal V2 may reach as high as 5000V when ignition. Thus, a high voltage power line 123 is needed to connect the lamp 122 and the power drive module 124, instead of a general low voltage power line. In addition, to avoid heat generated by the lamp 122 affecting normal operation of the power drive module 124, the power drive module 124 is kept away from the lamp 122. Thus, a long high voltage power line 123 is used to connect the lamp 122 and the power driven module 124.

The cost of the high voltage power line 123 is higher than the cost of the low voltage power line. The usage of the long high voltage power line 123 increases the cost of the whole device. Additionally, the high voltage signal V2 transmitted on the high voltage power line 123 disturbs neighboring electrical equipments, which may further reduce reliability of the electrical equipments. Taking FIG. 2 for example, since the power drive module 124 is connected to the lamp 122 by the high voltage power line 123 detouring the fan 126, the operational reliability of the fan 126 is affected by the high voltage signal V2 on the high voltage power line 123.

SUMMARY OF THE INVENTION

Accordingly, an illumination device is provided in the invention focusing on reduction of the usage of the high-voltage power line so as to reduce the cost and prevent the operational reliability of the electrical equipments neighboring the illumination device from being affected by the high-voltage signal.

An illuminating device adapted to a projecting apparatus is provided in an embodiment of the invention. The illumination device includes a lamp module, a power module, and a fan. The lamp module is separately disposed in the projecting apparatus. The lamp module includes a lamp, an igniting module, and a plate. The igniting module is capable of generating a high voltage signal to drive the lamp. The plate is disposed between the lamp and the igniting module for shielding radiating heat generated by the lamp. The power module is capable of generating a low voltage signal transmitted to the igniting module through a low voltage power line. The igniting module transforms the low voltage signal into the above mentioned high voltage signal when ignition. The fan is disposed at a first side of the lamp for cooling the lamp.

A projecting apparatus is provided in another embodiment of the invention. The projecting apparatus includes a lamp module, a fan, a power module, an image module, and a projection module. The lamp module is separately disposed in the projecting apparatus. The lamp module includes a lamp, an igniting module, and a plate. The igniting module is capable of generating a high voltage signal to drive the lamp. The plate is disposed between the lamp and the igniting module for shielding radiating heat generated by the lamp. The fan is disposed at a first side of the lamp for cooling the lamp. The power module is capable of providing power for the lamp module, the fan, the image module and the projection module. The power module also generates a low voltage signal transmitted to the igniting module through a low voltage power line. The igniting module transforms the low voltage signal into the above mentioned high voltage signal when ignition. The image module is utilized to modify a light beam generated by the lamp module into an imaging beam. The projection module projects the imaging beam to a screen.

The conventional illuminating device uses a long high voltage power line to connect the power module and the lamp, and the usage of long high voltage power line rises the cost and influences reliability of the neighboring electrical equipments. In comparison, the embodiment of the invention uses the high voltage power line only inside the lamp module for transmitting the high voltage signal from the igniting module to the lamp. Thus, the usage of the high voltage power line may be reduced. Moreover, it is also helpful for preventing the high voltage signal transmitted on the high voltage power line when ignition from disturbing the neighboring electrical equipments to result in the decreasing of reliability.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention will now be specified with reference to its embodiment illustrated in the drawings, in which.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
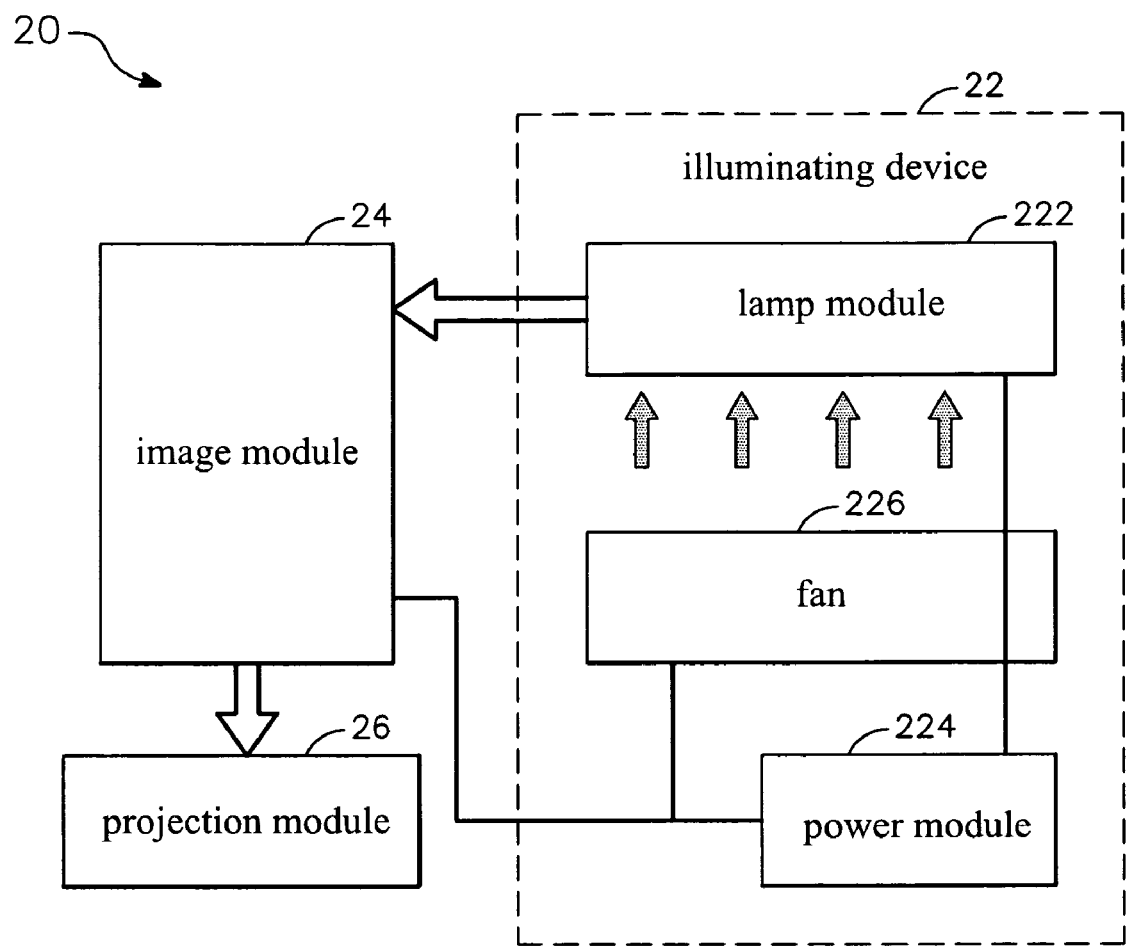
FIG. 3 is a schematic view of an embodiment of the projecting apparatus according to the invention.

FIG. 3 is a schematic view of an embodiment of the projecting apparatus 20 according to the invention. As it shows, the projecting apparatus 20 has a lamp module 222, a fan 226, a power module 224, an image module 24 and a projection module 26, wherein the lamp module 222, the fan 226, and the power module 224 composes an illuminating device 22 to provide light beams for the imaging of the projecting apparatus 20.

Figure 4A:
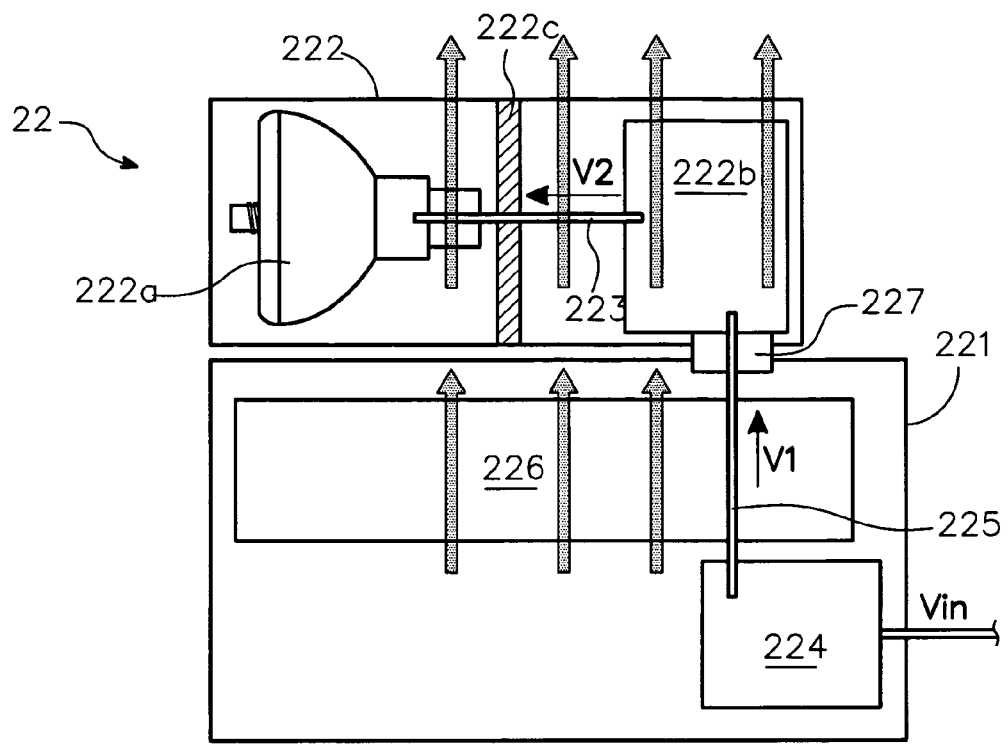
FIG. 4A is a schematic view of an embodiment of the illuminating device in FIG. 3.

FIG. 4A is a schematic view of an embodiment of the illuminating device 22 in FIG. 3. As it shows, the lamp module 222 has a lamp 222a, an igniting module 222b and a plate 222c. The lamp 222a may be a halogen lamp, an extra high voltage mercury lamp, a xenon lamp or other kinds of gas discharge lamp. The igniting module 222b is capable of generating a high voltage signal V2 to drive the lamp 222a. The high voltage signal V2 may reach a voltage of about 5000V when ignition. The plate 222c is disposed between the lamp 222a and the igniting module 222b for shielding radiating heat generated by the lamp 222a.

The lamp 222a generates a large amount of heat during illuminating, and the heat may badly influence the normal operation and the neighboring electrical equipments of the lamp 222a. As FIG. 4A shows, the fan 226 is disposed at a first side of the lamp 222a and close to the lamp 222a to generate airflow (shown by the arrows) for cooling the lamp 222a. For an embodiment of the invention, the plate 222c is roughly parallel to the flowing direction of the airflow generated by the fan 226 for better cooling effect.

Furthermore, the igniting module 222b also generates heat during operation. For an embodiment of the invention, the plate 222c and the igniting module 222b are disposed at a second side of the lamp 222a, and the second side is the back side of the lamp 222a. The second side is roughly vertical to the first side where the fans 226 is located. The airflow from the fan 226 flows in the direction parallel to the plate 222c and is divided into two parts by the plate 222c for cooling the lamp 222a and the igniting module 222b respectively.

Referring to FIG. 3, the power module 224 is utilized to provide power for the lamp module 222, the fan 226, the image module 24 and the projection module 26. Referring to FIG. 4A, as for the power supply for the lamp module 222, the power module 224 transforms the inputted power Vin into a low voltage signal V1, and the voltage signal V1 is about 380V for example. The low voltage signal V1 is transmitted to the igniting module 222b through a low voltage power line 225. The igniting module 222b transforms the low voltage signal V1 into the high voltage signal V2 when ignition to drive the lamp 222a. The high voltage signal V2 may reach a voltage level as high as 5000V. The light beams generated by the lamp 222a is modified into an imaging beam by the image module 24. Then, the imaging beam is projected to the screen by the projection module 26.

In addition, referring to FIG. 4A, the lamp module 222 is replaceable designed. For an embodiment of the invention, the fan 226 and the power module 224 of the illuminating device 22 are disposed on a lamp module holder 221. The lamp module 222 is separately assembled on the lamp module holder 221 through a connector 227. The connector 227 is disposed directly on the low voltage power line 225.

Figure 4B:
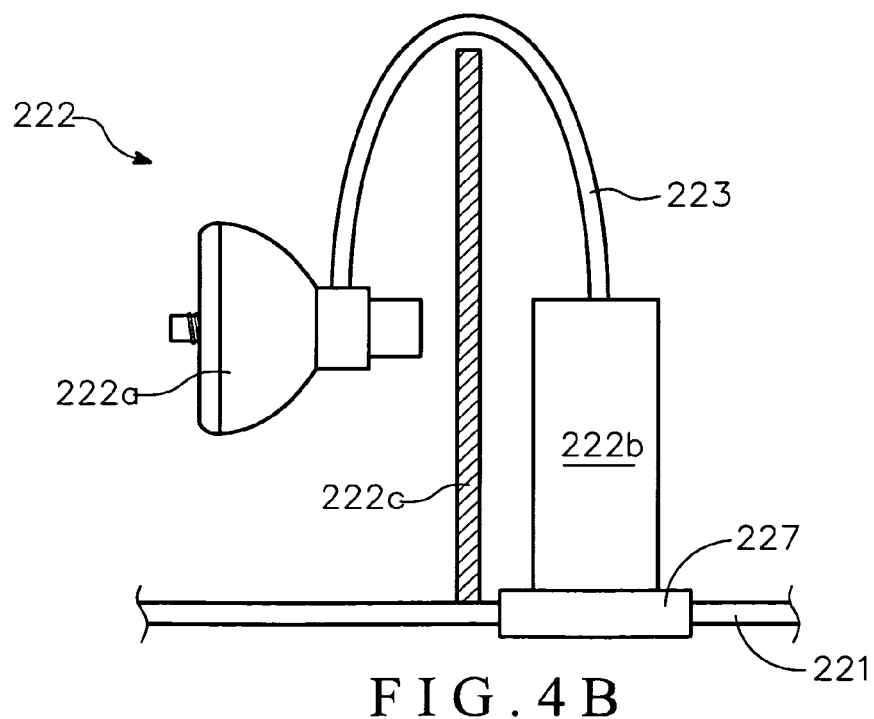
FIG. 4B is a schematic view of the illuminating device of FIG. 4A from a different direction.

FIG. 4B is a schematic view of the illuminating device 222 of FIG. 4A from a different direction, which is from the fan 226 toward the lamp module 222. As it shows, for an embodiment of the invention, since the plate 222c is disposed between the lamp 222a and the igniting module 222b to shield radiating heat generated by the lamp 222a, the high voltage power line 223 detours the plate 222c to connect the lamp 222a and the igniting module 222b. However, the invention is no so limited. There may be a through hole with a size relative to the diameter of the high voltage power line 223 made on the plate 222c. The high voltage power line 223 connects the lamp 222a and the igniting module 222b through the through hole. Thus, the demanded length of the high voltage power line 223 may be shortened.

In addition, in the embodiment of FIG. 4A, the power module 224 and the lamp module 222 are disposed at two opposite sides of the fan 226 respectively. The power module 224 is connected to the igniting module 222b by the low voltage power line 225 detouring the fan 226. Such disposal keeps an large enough distance between the power module 224 and the lamp module 222 to avoid the heat generated by the lamp module 222 from affecting the operation of the power module 224. Moreover, with a flowing direction from the power module 224 to the lamp module 222, the airflow of the fan 226 may be used to cool both the lamp module 222 and the power module 224 at the same time and further avoids the heat generated by the lamp module 222 transmitting to the power module 224. Additionally, as the power for driving the fan 226 is also provided by the power module 224, such disposal may reduce the distance between the fan 226 and the power module 224 so as to reduce the usage of power line.

Figure 1:
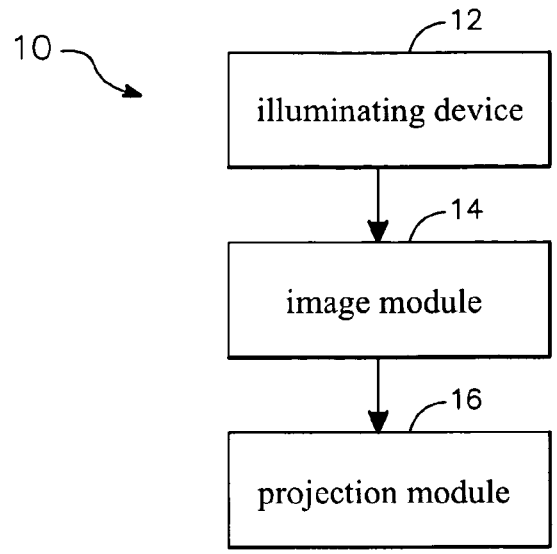
FIG. 1 is a block diagram of a typical projecting apparatus.
Figure 2:
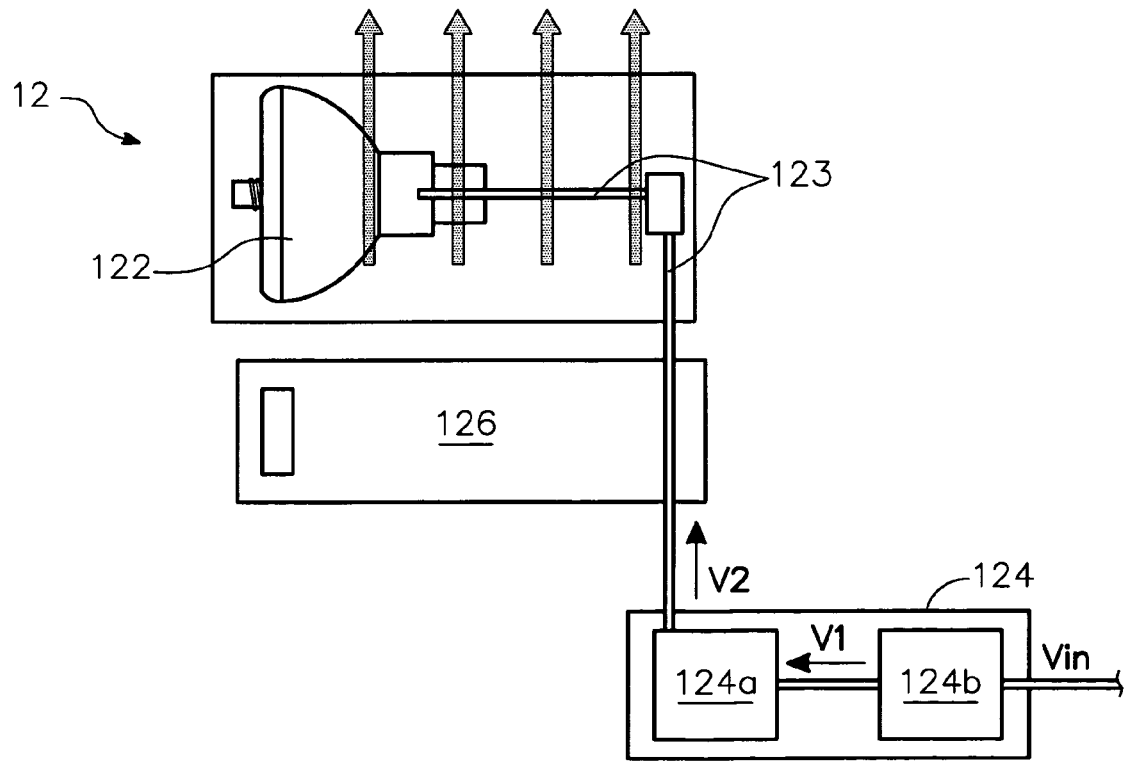
FIG. 2 is a schematic view of a typical illuminating device of a projecting apparatus.

As FIG. 1 shows, the conventional illuminating device uses a long high voltage power line 123 to connect the power module 124 and the lamp 122, and the usage of the long high voltage power line 123 rises the cost and influences reliability of the neighboring electrical equipments. In comparison, as FIG. 4 shows, the embodiment of the invention uses the high voltage power line 223 only inside the lamp module 222. The power line for connecting the lamp module 222 and the power module 224 is the low voltage power line 225. Thus, the usage of the high voltage power line 223 may be reduced. As the cost of the high voltage power lines 123, 223 is higher than the cost of the low voltage power line 225, the illuminating device 22 in the embodiment is cheaper. Moreover, since the high voltage power line 223 is restricted in the lamp module 222, it is helpful for preventing the high voltage signal V2 on the high voltage power line 123 from disturbing the neighboring electrical equipments to result in the decreasing of reliability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illuminating device, adapted to a projecting apparatus, including:
   a lamp module, including:
   a lamp;
   an igniting module, capable of generating a high voltage signal to drive the lamp; and
   a plate, disposed between the lamp and the igniting module; and
   a lamp module holder, including:
   a power module, capable of generating a low voltage signal transmitted to the igniting module through a low voltage power line, and the igniting module capable of transforming the low voltage signal into the high voltage signal;
   a fan, disposed at a first side of the lamp and capable of cooling the lamp; and
   a connector, disposed on the low voltage power line, and making the lamp module separately assembled on the lamp module holder;
   wherein the plate is arranged to shield the igniting module from heat generated by the lamp, and to separate an airflow generated by the fan into a first part for cooling the lamp and a second part for cooling the igniting module.

2. The illuminating device of claim 1, wherein the plate is parallel to a flowing direction of the airflow generated by the fan.

3. The illuminating device of claim 1, wherein the plate and the igniting module are disposed at a second side of the lamp, and the second side is roughly vertical with the first side.

4. The illuminating device of claim 1, wherein the high voltage signal generated by the igniting module is transmitted to the lamp through a high voltage power line.

5. The illuminating device of claim 1, wherein the power module and the lamp module are disposed at two opposite sides of the fan respectively.

6. An illuminating device, adapted to a projecting apparatus, including:
   a lamp module, including:
   a lamp;
   an igniting module, capable of generating a high voltage signal to drive the lamp; and
   a plate, disposed between the lamp and the igniting module;
   a power module, capable of generating a low voltage signal transmitted to the igniting module through a low voltage power line, and the igniting module capable of transforming the low voltage signal into the high voltage signal; and
   a fan, disposed between the lamp module and the power module and capable of cooling the lamp;
   wherein the plate is arranged to shield the igniting module from heat generated by the lamp, and to separate an airflow generated by the fan into a first part for cooling the lamp and a second part for cooling the igniting module.

7. The illuminating device of claim 6, wherein the plate is parallel to a flowing direction of the airflow generated by the fan.

8. The illuminating device of claim 6, wherein the fan is disposed at a first side of the lamp, and the plate and the igniting module are disposed at a second side of the lamp, and the second side is roughly vertical with the first side.

9. The illuminating device of claim 6, wherein the high voltage signal generated by the igniting module is transmitted to the lamp through a high voltage power line.

10. The illuminating device of claim 6, wherein the power module is connected to the igniting module by the low voltage power line detouring the fan.

11. A projecting apparatus, including:
    a lamp module, separately disposed in the projecting apparatus through a connector, including:
    a lamp;
    an igniting module, capable of generating a high voltage signal to drive the lamp; and
    a plate, disposed between the lamp and the igniting module;
    a fan, disposed at a first side of the lamp and capable of cooling the lamp;
    an image module, capable of modifying a light beam generated by the lamp module into an imaging beam;
    a projection module, capable of projecting the imaging beam to a screen; and
    a power module, capable of providing power for the lamp module, the fan, the image module and the projection module, generating a low voltage signal transmitted to the igniting module through a low voltage power line, and the igniting module capable of transforming the low voltage signal into the high voltage signal;

wherein the plate is arranged to shield the igniting module from heat generated by the lamp, and to separate an airflow generated by the fan into a first part for cooling the lamp and a second part for cooling the igniting module.

12. The projecting apparatus of claim 11, wherein the plate is parallel to a flowing direction of the airflow generated by the fan.

13. The projecting apparatus of claim 11, wherein the plate and the igniting module are disposed at a second side of the lamp, and the second side is roughly vertical with the first side.

14. The projecting apparatus of claim 11, wherein the high voltage signal generated by the igniting module is transmitted to the lamp through a high voltage power line.

15. The projecting apparatus of claim 11, wherein the power module and the lamp module are disposed at two opposite sides of the fan respectively.

16. The projecting apparatus of claim 11, wherein the connector is disposed on the low voltage power line.

* * * * *